Sept. 28, 1937.  H. H. VAIL  2,094,247
CLUTCH MECHANISM
Filed Aug. 22, 1933  3 Sheets—Sheet 3
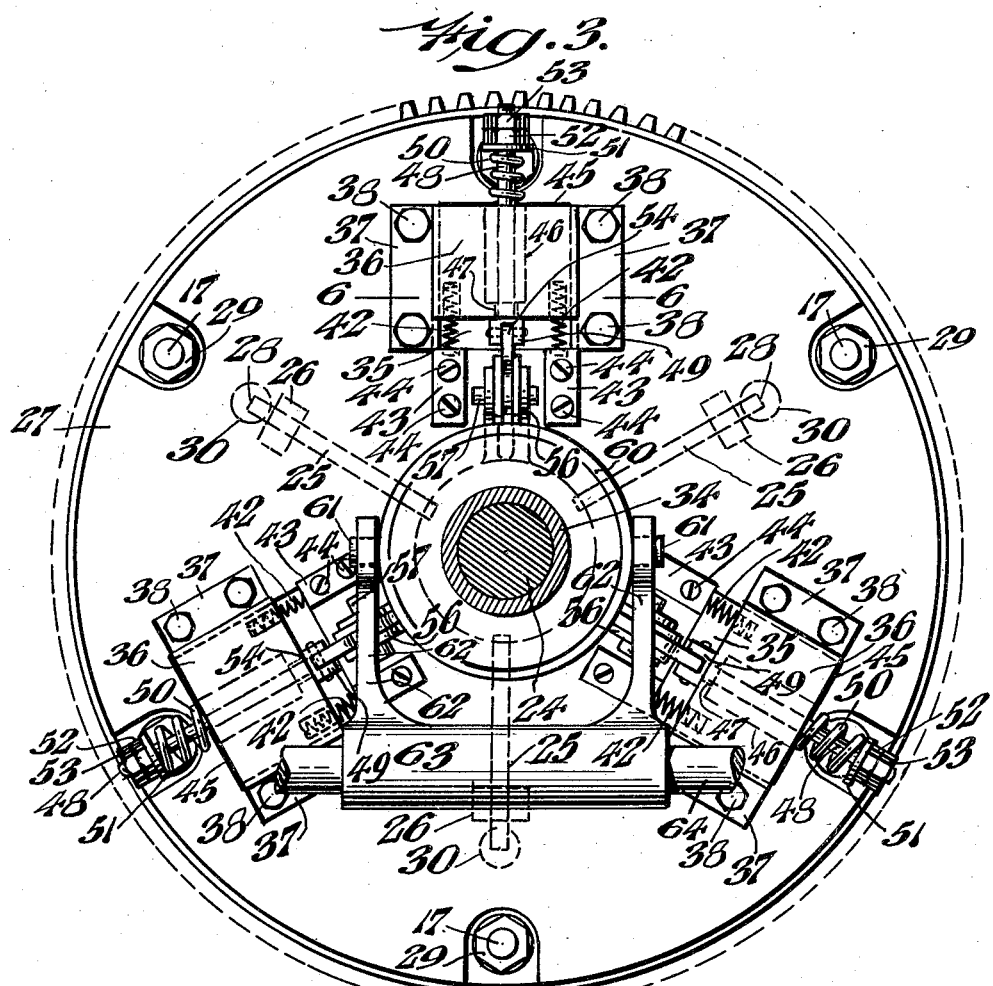
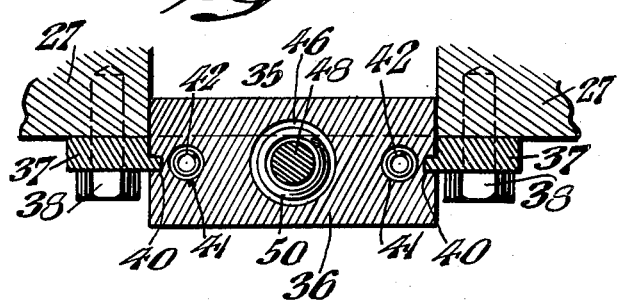
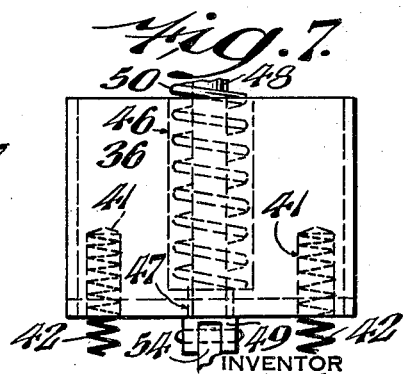
INVENTOR
Henry H. Vail,
BY
Robert M. Barr
ATTORNEY Patented Sept. 28, 1937

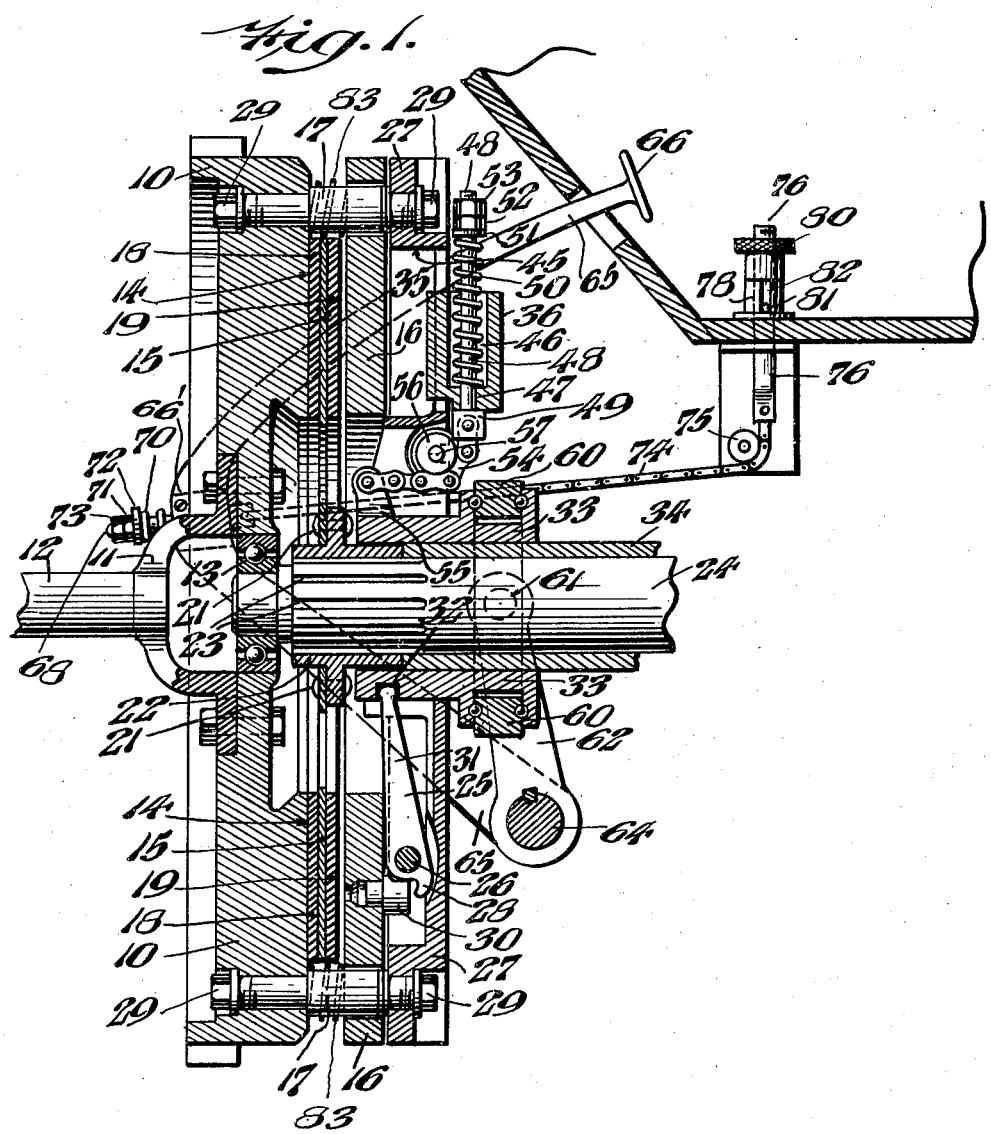

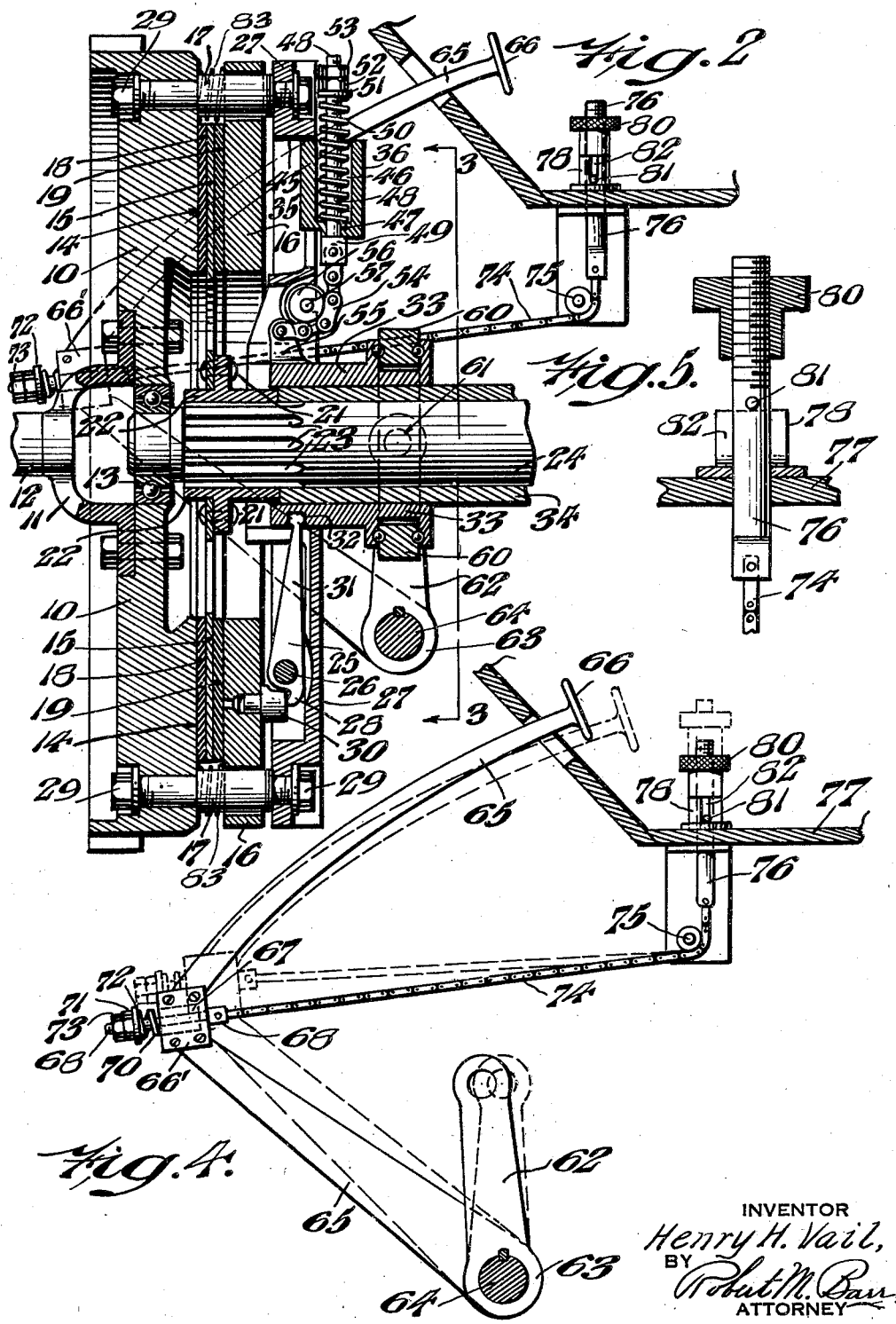

2,094,247

UNITED STATES PATENT OFFICE 2,094,247

CLUTCH MECHANISM

Henry H. Vail, Deltaville, Va.

Application August 22, 1933, Serial No. 686,198

4 Claims. (Cl. 192—105)

The present invention relates to clutch mechanisms and more particularly to a self-operating or automatic type of clutch.

While there have been heretofore many types of automatic clutches which are operated by centrifugally acting weights, those in which a lever type of centrifugal weight have been used are found to be the more practical, though open to a number of operating objections. In modern automobiles and other mechanism where an automatic clutch is desirable, an essential requirement is that the assembly be as compact as possible and consist of as few parts as necessary to carry out the desired end. Thus for example the early used multiple disc clutch has been displaced by the single disc clutch. In the control of either the single or multiple type by centrifugal force, weighted levers have been most tried but it has been found that mounted levers for proper operation take up practically all clearances and that left for clutch operation is so minute that great difficulty has been experienced in initially adjusting the clutch plates so that they will operate at all. With tolerances of ten thousandths of an inch it virtually becomes impossible to produce structure satisfactory in every respect but when wear of the parts is taken into consideration the nice relation of the parts and adjustments are destroyed and readjustments are necessary which are practically impossible to make. While these difficulties are more particularly inherent in lever type weights they have also been found to exist in other types of centrifugally controlled clutches, though the latter are more particularly objectionable and ineffective because of the complicated multiplicity of parts. Furthermore there is a distinct disadvantage in all prior centrifugally controlled clutches in that at operating speeds it becomes impossible for the operator of the vehicle to exert sufficient pedal pressure upon the clutch pedal to overcome the weight pull and bring about a declutching action. This is a very serious difficulty and has heretofore only been partly answered by the provision of means for restoring the clutch temporarily to the conventional foot pedal control.

Some of the objects of the present invention are to provide an improved self-operating clutch under the control of centrifugally operated weights; to provide a centrifugal control for clutches wherein efficient clutch adjustment and operation are not restricted by impractically minute tolerances; to provide a clutch structure controlled by a centrifugal mechanism wherein clutch plate adjustment can be made at the will of the operator with a wide range of control while the parts are operatively assembled; to provide a clutch control mechanism wherein a declutching operation can be carried out independent of the centrifugal force developed by control weights; to provide a clutch mechanism wherein it is possible to manually control clutch engagement at idling speed with a minimum of effort; to provide a construction wherein an applied centrifugal force is so controlled as to render effective only that force necessary for clutch engagement under all operating conditions; to provide a clutch construction wherein the manual clutch pedal and associated parts are maintained in substantial equilibrium, whereby a minimum applied foot pressure is required to cause a state of unbalance necessary to bring about a predetermined operation for either clutching or declutching operations; to provide a novel clutch pedal adjustment for controlling clutch plate clearance; and to provide other improvements as will hereinafter appear.

In the accompanying drawings Fig. 1 represents a vertical axial section of a clutch mechanism embodying one form of the present invention and showing the parts in position assumed under idling speed of the engine; Fig. 2 represents a like section showing the parts in operating position as under driving speeds; Fig. 3 represents a section on line 3—3 of Fig. 2; Fig. 4 represents a detail in side elevation of the declutching pedal together with one form of control adjustment; Fig. 5 represents on an enlarged scale and partly in section the hand operated member for clutch adjustment and pedal control; Fig. 6 represents a section on line 6—6 of Fig. 3; and Fig. 7 represents a detail in front elevation of any one of the operating weights.

Referring to the drawings one form of the present invention is shown as assembled with a clutch unit, which may be of any standard or suitable construction, comprising a fly wheel 10 attached by a coupling 11 to a driving shaft 12 and suitably journalled on a ball bearing 13. The outer face 14 of the fly wheel 10 serves as the thrust face against which the clutch plate 15 is clamped by the controlled pressure plate 16 which is arranged to slide axially on driving studs 17 projecting from the fly wheel 10. The radial location of these studs 17 is such as to locate them beyond the periphery of the clutch plate 15. Preferably opposite sides of the plate 15, which are exposed to the clamping action to bring about the friction driving, are faced respectively with ring members 18 and 19 preferably impregnated with graphite or like functioning material. The clutch plate 15 is made fast by rivets 21 or other fastening devices to a flanged hub 22 which is internally ribbed for axial sliding movement in the end grooves 23 in the driven shaft 24. This construction permits free axial movement of the hub 22 upon the shaft 24 while transmitting torque therefrom to the shaft 24. In this instance the end of the shaft 24 rides in the bearing 13 as a journal therefor.

For the purpose of shifting the pressure plate 16 towards the thrust face 14 to cause clutch operation, and away from said face 14 for idling and declutching action, a plurality of substantially radially disposed levers 25 are provided, each being fulcrumed upon a separate pivot pin 26 fixed to an anchor plate 27 which is held rigidly spaced from the fly wheel 10, though rotatable therewith by means of the threaded ends, washers and nuts 29 of the stud bolts 17. It should be noted that the two shank portions of the stud bolts 17 are of reduced diameter in order to provide a shouldered body part so that each serves to space the anchor plate 27 a definite distance from the fly wheel face 14 and give plenty of room to receive the clutch plate 15 and to allow for the required movement of pressure plate 16. Each lever 25 is correspondingly pivoted and each fulcrum point divides its lever into a short arm 28 bearing on a wear thrust block 30, and a long arm 31 arranged to seat in a recess 32 provided in a collar 33, this last being axially slidable upon a bearing sleeve 34 for the driven shaft 24. Thus by shifting the collar 33 to the right, as seen in Fig. 1, the levers 25 are rocked in a clockwise direction so that the short arms 28, acting against the blocks 30, move the pressure plate 16 to the left to cause clutch engagement whereby the rotary motion of the fly wheel 10 is transmitted to the driven shaft 24. When the collar 33 is moved to the left the pressure of the levers 25 is released and the pressure plate 16 left free to declutch. In connection with the levers 25 it should be noted that the ratio of the arms 31 to the arms 28 is obviously six to one so obviously a relatively small applied force is required to exert a relatively large clamping or clutching action.

As a means for bringing about an automatic control of clutch operation, the anchor plate 27 is apertured to form in this instance three symmetrically located substantially rectangular openings 35 for respectively receiving for sliding movement therein block shaped weights 36. Way strips 37 are fastened by studs 38 to the face of the plate 27, each opening 35 spacing a pair of the strips, and each strip forms a rib and groove connection 40 with the adjacent side of a weight 36. By this construction the weights 36 are definitely guided to travel, under the action of centrifugal force, radially of the plate 27. Preferably each weight 36 has its inner end provided with bores 41 to respectively receive two coil springs 42 which project therefrom and seat within retainers 43 fastened in adjusted position by screws 44. These springs 42 serve to steady the weights 36 at idling speed of the fly wheel 10 and prevent noise and rattles of otherwise relatively loose weights but do not in any way restrict the free outward movement of the weights under normal vehicle operating speeds. In connection with the guide openings 35 it should be noted that the radial dimension of each, while necessarily greater than the length of the weight therein, is definitely proportioned to limit the outward travel of the weights. Thus the design is such that when the weights 36 ride outwardly and abut the respective stop faces 45 the centrifugal force developed is that required to hold the clutch plates in driving relation regardless of speed or other operating conditions. That this force can be relatively small will be readily apparent when the mechanical magnifying movements acted upon by it are considered and explained.

In order to transmit the outward pull of the weights 36 to the pressure plate 16, and also to prevent outward movement of the weights 36 until a predetermined idling speed of the fly wheel 10 has been exceeded, each weight 36 has a through bore 46 terminating at one end in a guide bore 47 of reduced diameter. The bore 47 serves as a bearing for guiding an axially movable rod 48 which is normally held outwardly pressed by a coil spring 50 compressed between the shouldered end of the bore 46 and a follower washer 51 by the adjusted position of a nut 52 on the threaded end of the rod 48. A lock nut 53 maintains the adjusted position of the nut 52. The end of the rod 48 which passes through the bore 47 terminates in a shouldered head 49 seating against the opposed end of the weight 36 and is maintained in such position by the action of the spring 50. The head 49 is connected by a chain 54 or other suitable flexible means to an ear 55 connected to or formed integral with the collar 33 and since the pull on the chain 54 is radial with respect to the shaft 24 while the pull on the collar 33 is parallel to the shaft 24, a pulley wheel 56 is journalled at 57 in such position as will permit both ends of the chain to have a straight line movement. It is to be understood that this description applies to any one of the weights 36 and its associated parts.

For the purpose of manually controlling the clutch action so that declutching and clutching, as well as plate adjustment can be made at will, the collar 33 is circumferentially grooved to receive an actuating ring 60 having diametrically opposite lugs 61 for respectively pivoting the arms 62 of a shift fork 63. This latter is keyed to a rock shaft 64 which is suitably journalled in a fixed part and is arranged to be rocked by a clutch pedal lever 65. Preferably the shaft 64 is so located with respect to the foot pedal 66 as to bring the weight of the lever 65 to the clutch side of the rock shaft 64, and as this lever 54 is substantially V-shaped, its overhung weight is sufficient to hold the chains 54 in tension and the long arm levers 25 in declutched position so that the pressure plate 16 is practically in floating relation though, as will be explained, it is actually definitely limited in its free movement through a novel controlled adjustment.

As a means for thus limiting the free movement of the pressure plate 16 and for maintaining a predetermined clearance between said plate 16 and the clutch plate 15, a block 66' is mounted upon the lever 65, preferably at the apex thereof, and has a bore 67 therethrough of one diameter to form a guide bearing for a rod 68 and of another diameter to receive a spring 70 coiled about the rod 68 and maintained under a predetermined pressure by a nut 71 threaded on the rod and acting against a follower washer 72. A lock nut 73 retains the parts in adjusted relation. The end of the rod 68, which projects from the opposite side of the block 66, is connected to a chain 74 or other flexible member which passes around a pulley 75 and joins a pull plunger 76 passing through the floor board 77 at a place for convenient operation. A bushing 78 is secured to the floor board in encircling relation to the plunger 76 and serves as a seat for a knurled thumb nut 80 on the threaded end of the plunger 76. In the position of the parts as seen in Figs. 1 and 2 it will be evident that rotation of the nut 80 acting against the bushing 78 as a thrust member will result in an exceedingly accurate adjustment of the plate 16 towards or away from the plate 15 according to the direction in which the nut is turned.

In case it is desired to operate the clutch entirely by manual foot pedal control as in present day conventional driving, and entirely cutting out the self-operating control, the plunger 76 can be pulled up to the position shown in Fig. 5 and locked in such position by means of a pin 81. This pin 81 passes transversely through the plunger 76 at the proper location and normally rides in a slot 82 cut in the upper end portion of the bushing 78. When the plunger 76 is lifted to bring the pin 81 out of the slot 82, it can be turned so that the pin 81 then rests upon the top edge of the bushing 78 and thereby holds the clutch pedal 65 in clutch engaging position. In this position the clutch pedal 66 can be operated for declutching because it can move relative to the stretched chain 74 by compressing the spring 70.

In connection with the movement of the plate 16 to idling position it should be noted that the plate 16 has a natural tendency to run free when the pull of the weights 36 ceases but in order that there may be no delayed releasing with consequent drag upon the clutch face it is preferable to provide coil springs 83. These springs 83 are shown here as respectively encircling the studs 17 between the face of the fly wheel 10 and the opposed face of the plate 16. The arrangement is such that the springs 83 are compressed when the plate 16 is in clutch engaging position and the relatively small amount of stored energy in the springs 83 is sufficient to ensure the prompt disengagement of the plate 16 when the latter is ready to move to declutching position.

In describing the operation of the clutch mechanism of the present invention it will be assumed that the parts are in the positions shown in Fig. 1 and that the fly wheel 10 is rotating at the idling speed of the engine. At such idling speeds the fly wheel 10, the anchor plate 27, and the pressure plate 16, are rotating about the shaft 24 as an axis and this shaft 24 is at rest. The pressure plate 16 is merely floating adjacent to the clutch plate 15 because the long arm levers 31 are in declutching position due to the fact that the collar 33 is at the limit of its movement to the left. So long as the idling speed remains constant the centrifugal force developed is insufficient to cause the weights 36 to move outward and consequently no clutching action can take place. If, however, it is desired to start the vehicle the speed of the motor is increased and the centrifugal action causes the weights 36 to move radially outward and thereby shift the collar 33 to the right as seen in these figures. This movement rocks the long arm levers 31 in a clockwise direction and causes the pressure plate 16 to be moved in the direction to frictionally clamp the clutch plate 15 against the thrust wall 14 of the fly wheel 10 for driving purposes. In connection with the movement of the weights 36 it will be noted that due to the long arm levers 31 a relatively small centrifugal force is required to move and hold the pressure plates 16 in clutching position. In view of this each stop face 45 of the anchor plate 27 is located radially from the shaft 24 a distance which will bring the weights 36 to rest after the required clutch holding force has been developed. Preferably this radial distance of the stop faces 45 somewhat exceeds the desired point in order to insure sufficient centrifugal pull to take care of any extraordinary demands upon the clutch. Due to this stoppage of the weights 36 the chains 54 and associated elements are subjected only to the pull necessary for efficient operation under all speed conditions, and are never subjected to the tremendous stress of weights which are free to swing outwardly unrestrained. As this radial acting force is transmitted through the springs 50 to the rod 48, it will be apparent that the rods 48 can be drawn inwardly for declutching purposes at any time desired by the force necessary to overcome the set tension of the springs 50. Thus the retractive effort for declutching is very small under all conditions and the pedal pressure required to carry out this declutching is an almost negligible effort.

The present construction also includes and makes possible a very effective manual clutch operation at idling speeds without influencing the weights 36 or other associated parts. Thus for example with the engine idling it may be necessary to operate the motor vehicle in reverse, and if that is to be done the proper transmission shift of gears is made and then with the engine and fly wheel 10 still maintaining the idling speed the toe of the operator can be placed under the clutch pedal 66 and by lifting it gently the collar 33 can be shifted to cause the pressure plate 16 to engage the plate 15 and thereby transmit rotation to the driven shaft 24. Thus a very positive and delicate clutch engaging operation can be made which permits backing in safety and avoids the use of the engine accelerating pedal which if suddenly depressed results in the car jumping rearwardly in a hazardous manner. Of course the same control may be had for moving forwardly slowly if desired.

In connection with the clutch pedal mechanism it is now possible to initially adjust the pressure plate 16 to the required position relative to the clutch plate 15 by placing the necessary pressure upon the spring 70 in order to shorten or lengthen the distance of the apex of the pedal lever 65 from the floor board. Any movement of the pedal is transmitted through the arm 62 to the collar 33 and thence by the levers 31 to the pressure plate 16 for distance adjustment. When this is once set by locking the nuts 71 and 73 in place this adjustment need not be further disturbed because in case of wear, or for any other reason an adjustment becomes necessary, the adjustment can be made by rotating the thumb nut 80 in the direction to bring about the desired clutch plate change of relation. If at any time it is desired to bring the clutch under manual control and dispense with the self-operating mechanism it can be done by lifting the plunger 76 against the pull of the spring 70 so that this latter will then act through the pedal lever 65 to maintain the pressure plate 16 in clutching relation as in ordinary non-automatic clutches. With the plunger 76 raised to the position shown in Fig. 5 and locked in position by turning the pin 81 to locking position, a declutching operation can be made by pressing the pedal towards the floor.

While only a single form is shown in which this invention may be embodied, it is to be understood that the invention is not limited to any specific construction, but might be applied to various forms without departing from the spirit of the invention or the scope of the appended claims.

Having thus described my invention, I claim:—

1. A clutch mechanism comprising a fly wheel arranged for operation by a driving shaft, a clutch plate arranged to operate a driven shaft, actuating means including a slidable sleeve and centrifugally controlled radially slidable weights for causing said plate to be driven by said fly wheel, a radially disposed aperture in each of said weights, a rod slidable within said aperture and terminating in an adjustable head, a spring pressed between each head and each weight, and manually controlled means for shifting said sleeve.

2. A clutch mechanism comprising a fly wheel arranged for operation by a driving shaft, a clutch plate arranged to operate a driven shaft, actuating means including centrifugally controlled weights for causing said plate to be driven by said fly wheel, a clutch pedal lever for also controlling said actuating means, and adjustable restraining means operating through said lever to adjust said actuating means to maintain a predetermined clearance relation between said clutch plate and said fly wheel.

3. A clutch mechanism comprising a fly wheel arranged for operation by a driving shaft, a clutch plate arranged to operate a driven shaft, means including a lever system for causing said clutch plate to engage said fly wheel, a plurality of radially disposed rods, flexible members respectively between said rods and said causing means, abutments on the free ends of said rods, an anchor plate rotatably connected to said fly wheel and provided with apertures forming guide ways, weights mounted for radial sliding movement in said guideways, springs tensioned respectively between said abutments and said weights, and means to stop said weights in a position to maintain a constant effective centrifugal force applied through said springs to said rods, whereby said rods can be operated to release said connecting means by overcoming the excess spring pressure only.

4. A clutch mechanism comprising a fly wheel arranged for operation by a driving shaft, a clutch plate arranged to operate a driven shaft, an axially movable pressure plate for causing said fly wheel to actuate said clutch plate, pivoted lever arms for moving said pressure plate, a sleeve mounted to slide lengthwise of said driven shaft for controlling said arms, a plurality of radially movable rods, connections between said rods and said sleeve, weights mounted respectively on said rods for movement relative thereto, coil springs respectively encircling said rods to bear against said weights, means to place said springs under a predetermined pressure, abutments respectively limiting the movement of said weights under centrifugal force, and means including a clutch lever connected to said sleeve, whereby said sleeve can be moved to declutching position while said weights remain in contact with said abutments.

HENRY H. VAIL.